United States Patent
Frigge et al.

(10) Patent No.: US 9,028,636 B2
(45) Date of Patent: May 12, 2015

(54) METHOD FOR MANUFACTURING AN ADHESIVE TAPE, PARTICULARLY SUITED FOR LONGITUDINAL WRAPPING OF ELONGATED GOODS

(71) Applicant: Coroplast Fritz Müller GmbH & Co. KG, Wuppertal (DE)

(72) Inventors: Christoph Frigge, Sprockhövel (DE); Klaus Becker, Sprockhövel (DE)

(73) Assignee: COROPLAST FRITZ MULLER GMBH & CO. KG, Wuppertal (DE)

( * ) Notice: Subject to any disclaimer, the term of this patent is extended or adjusted under 35 U.S.C. 154(b) by 144 days.

(21) Appl. No.: 13/645,567

(22) Filed: Oct. 5, 2012

(65) Prior Publication Data

US 2013/0087274 A1    Apr. 11, 2013

(30) Foreign Application Priority Data

Oct. 6, 2011    (EP) .................................... 11184094

(51) Int. Cl.
| | |
|---|---|
| *B32B 38/10* | (2006.01) |
| *B32B 38/04* | (2006.01) |
| *B32B 38/00* | (2006.01) |
| B32B 37/12 | (2006.01) |
| B32B 37/20 | (2006.01) |
| H02G 3/04 | (2006.01) |

(52) U.S. Cl.
CPC ............. *B32B 38/04* (2013.01); *B32B 38/0004* (2013.01); *B32B 37/12* (2013.01); *B32B 37/203* (2013.01); *H02G 3/0481* (2013.01); *B32B 2038/045* (2013.01)

(58) Field of Classification Search
CPC ....................................................... B32B 38/10
USPC ........................ 156/247, 510, 379.6
See application file for complete search history.

(56) References Cited

U.S. PATENT DOCUMENTS

| | | | |
|---|---|---|---|
| 2003/0198806 A1* | 10/2003 | Samson-Himmelstjerna et al. ............................. | 428/343 |
| 2010/0084084 A1* | 4/2010 | Miller, II ...................... | 156/249 |
| 2010/0291352 A1* | 11/2010 | Jager ............................. | 428/189 |

FOREIGN PATENT DOCUMENTS

| | | |
|---|---|---|
| DE | 2 052 271 | 10/1970 |
| DE | 20 2007 012 475 U1 | 2/2009 |
| EP | 1 315 781 B1 | 1/2005 |
| EP | 2 047 985 A1 | 4/2009 |
| IT | WO 2010/039949 A1 | 4/2010 |
| WO | WO 2006/016393 A1 | 2/2006 |

OTHER PUBLICATIONS

Examination Report—Mar. 22, 2012.

* cited by examiner

*Primary Examiner* — Daniel Lee
(74) *Attorney, Agent, or Firm* — Brinks, Gilson & Lione

(57) ABSTRACT

An apparatus for producing adhesive tape for sheathing of extended products, having two tape plies, having a carrier material with an adhesive coating. The carrier material being unwound from a feeding roll, the one tape ply with its adhesive coating being laminated against the other tape ply with a lateral projection (Ü1, Ü2) on at least one side. The carrier material is unwound from a feeding roll, which is configured as a wide roll, on which the carrier material has a greater width than its width required for laminating, and the carrier material is cut into two strips extending in along the tape which have the width required for laminating, the strips being separated and laminated such that each strip forms a tape ply in at least one adhesive tap.

8 Claims, 4 Drawing Sheets

METHOD FOR MANUFACTURING AN ADHESIVE TAPE, PARTICULARLY SUITED FOR LONGITUDINAL WRAPPING OF ELONGATED GOODS

CROSS-REFERENCE TO RELATED APPLICATION

This application claims priority to European Patent Application No. 11184094.8, filed Oct. 6, 2011.

FIELD OF THE INVENTION

The present invention relates to a method for producing at least one adhesive tape for, in particular, longitudinal sheathing of longitudinally extended products. The tape having two tape plies, each of which consists of a carrier material which is coated, full-surface or partially, for example in strips, with an adhesive coating on at least one side of one of the tape plies, the carrier material being unwound from a feeding roll. The one tape ply with its adhesive coating being laminated with a lateral projection configured on at least one of the longitudinal sides thereof against the other tape ply, and the adhesive tape composed of the laminated tape plies being wound onto a winding roll.

Furthermore, the invention relates to an apparatus to implement such a method, having at least one winding roll for the adhesive tape and having at least one rotatable feeding roll for feeding each tape ply to be laminated to the winding roll.

BACKGROUND AND SUMMARY OF THE INVENTION

In the automotive industry, cable sets (or wiring harnesses) are often wrapped with adhesive tapes, whereby, apart from the pure bundling function, mainly textile adhesive tapes provide numerous additional functions, such as protecting the wiring from abrasion, or damping rattling or vibration noises. It has been common to use fabric adhesive tapes as well as various non-woven adhesive tapes, film adhesive tapes and foam adhesive tapes. For the still commonly used helical winding of longitudinally extended products, such as cable sets, bands in which a largely non-adhesive sheath is achieved after sheathing the product are also provided as an alternative to the normally used single-sided full-surface adhesive tapes. Especially by using bands with a double-ply configuration, which can be produced according to a method as described above, whereby two tape plies with lateral projections are laminated one against the other, a significantly greater protection from abrasion and a greater cushioning effect can be accomplished than with single-ply sheathing on the one hand, and on the other hand, these bands, which among other things, are described in DE 20 52 271 A1, and in a further development in EP 1 315 781 B1, have the advantage of a significantly greater flexibility.

The production of these adhesive tapes is not specified in more detail in the above-referenced documents. EP 1 315 781 B1 merely mentions in general that the adhesive tapes are laminated one upon the other such that the adhesive mass of the first carrier material adheres to the adhesive mass of the second carrier material. A production method has, however, been known from the workplace, according to which, in order to ensure the mechanical processability of the adhesive tape plies, operational rolls with the required adhesive tape width are produced in the first instance from supply rolls, onto which the adhesive tape is wound with a great width, so-called wide rolls, which are then laminated laterally offset against one another in a further working step. As these operational rolls have to be prefabricated in the first instance, in particular precut, the method is relatively time and cost intensive.

The underlying object of the invention is to provide a method of the type mentioned above and an apparatus for its implementation, by means of which adhesive tapes can be produced in which a first tape ply can be laminated with its adhesive coating with a lateral projection against the adhesive coating of a second tape ply, whereby the production effort of the adhesive tape can be reduced by ensuring an advantageous economical use of the materials and an easy mechanical processability of the adhesive tape plies.

With respect to the method, it is accomplished according to the present invention in that the carrier material for forming at least one of the tape plies is unwound from a feeding roll, which is configured as a wide roll, on which the carrier material has a greater width than its width required for laminating, and that the carrier material is cut into two strips extending in the longitudinal direction of the band and have the width required for laminating, the strips being separated and laminated such that each strip forms at least one tape ply in respectively at least one adhesive tape.

In this way, an adhesive tape can be produced by means of the invention that on the one hand has a largely non-adhesive internal side and thus advantageously provides the possibility of producing highly flexible sheaths for extended products, like cable sets, but whose production, on the other hand, is simplified insofar as no precut operational rolls are required for this purpose. In particular, the productivity is increased by the parallel production of at least two, and depending on the width of the wide roll, also a plurality of adhesive tapes at the same time. This results in considerable time and thus cost savings compared to the known method.

Furthermore, it is also advantageous that the separate winding rolls—which in particular run at the same speed—onto which the adhesive tapes produced according to the present invention are wound, can be arranged on a common shaft and/or preferentially alternately on two common shafts to separate the strips, for which only one drive is necessary.

With respect to the apparatus, the object of the invention is attained in that at least one feeding roll is configured as a wide roll, on which the carrier material provided with the adhesive coating has a greater width than its width required for laminating, at least one cutting device to cut the carrier material provided with the adhesive coating into strips extending in the longitudinal direction of the band being arranged between the wide roll and the winding roll.

For an optimal selection of the cutting device, e.g. the crush cut system, in which a circular knife works against a roller; the shear cut system, in which a circular knife "dives" into a lower knife; the blade cutting system, in which a stationary blade dives into the transiting product; or the burst cut system, in which a driven circular knife works against a freely guided path, are used. The knives can also be cooled or heated if necessary. Other cutting methods, such as laser cutting or water jet cutting are conceivable. Which cutting method is used depends on the material of the adhesive tapes.

Further advantageous characteristics of the invention are contained in the dependent claims as well as in the description below.

BRIEF DESCRIPTION OF THE DRAWINGS

The invention will be described below in more detail by means of the exemplary embodiments according to the present invention illustrated in the attached drawing.

In the drawing.

DETAILED DESCRIPTION OF THE INVENTION

Figure 1:
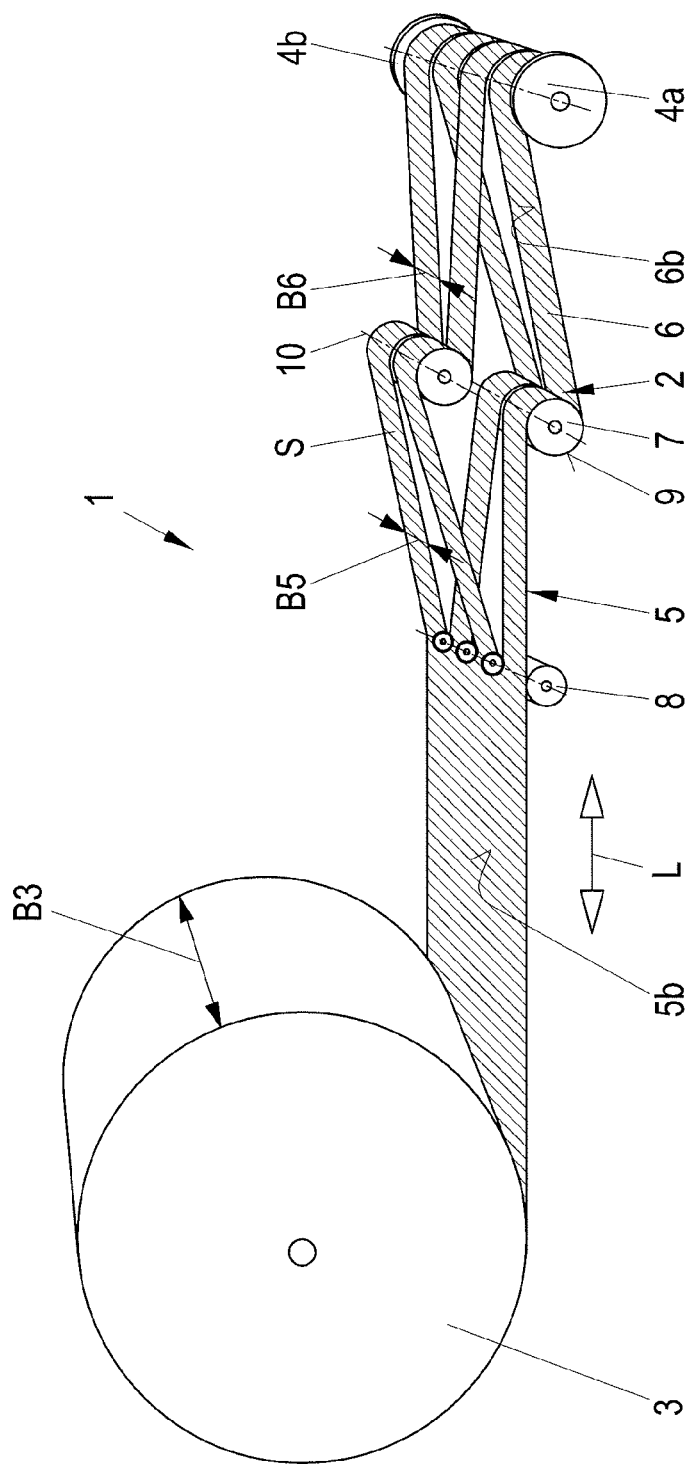
FIG. 1 is a perspective view of a first embodiment of an apparatus according to the present invention to implement a first embodiment of a method according to the present invention.

With respect to the description below, it is expressly pointed out that the invention has not been restricted to the exemplary embodiments, and thus not to all or several characteristics or described combinations of characteristics, but each individual partial characteristic of the/each exemplary embodiment can also be fundamental to the present invention independently of all other partial characteristics described above, as such or also in combination with any characteristic of any other exemplary embodiment.

The same and/or functionally corresponding parts are always denoted with the same reference numerals in the different figures of the drawing and are therefore described only once each time.

As illustrated in FIG. 1 in the first instance, the first embodiment of an apparatus 1 according to the present invention to implement a method according to the present invention, which is in particular used for producing an adhesive tape 2 for longitudinal sheathing of longitudinally extended products, includes at least three (exactly three are illustrated) rotatably arranged feeding rolls 3, 4a, 4b. A first tape ply 5 is provided by the first feeding roll 3 to form the adhesive tape 2, and a second tape ply 6 is respectively provided by the second feeding roll 4a as well as by the third feeding roll 4b.

Figure 5:
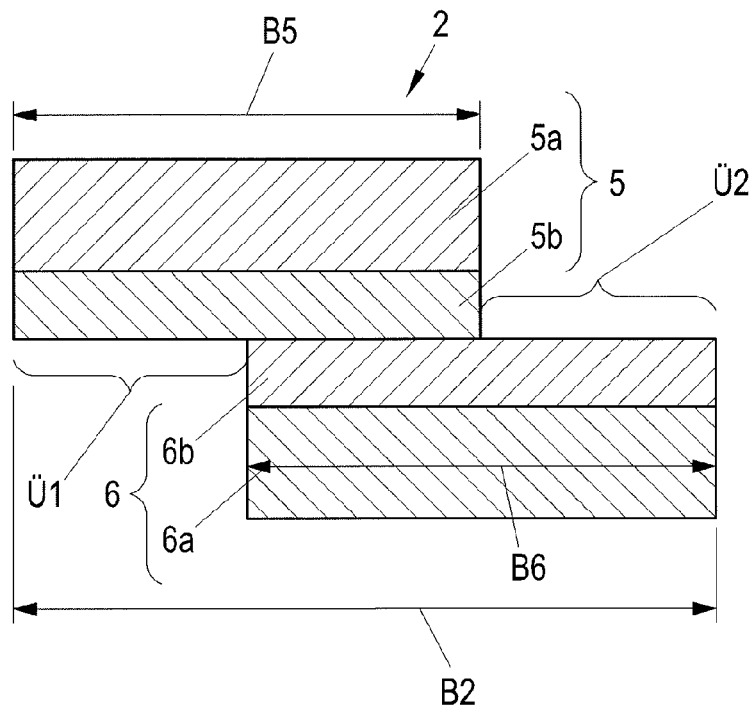
FIGS. 5 and 6 show two crush-cut embodiments of adhesive tapes for longitudinal sheathing of longitudinally extended products.
Figure 6:
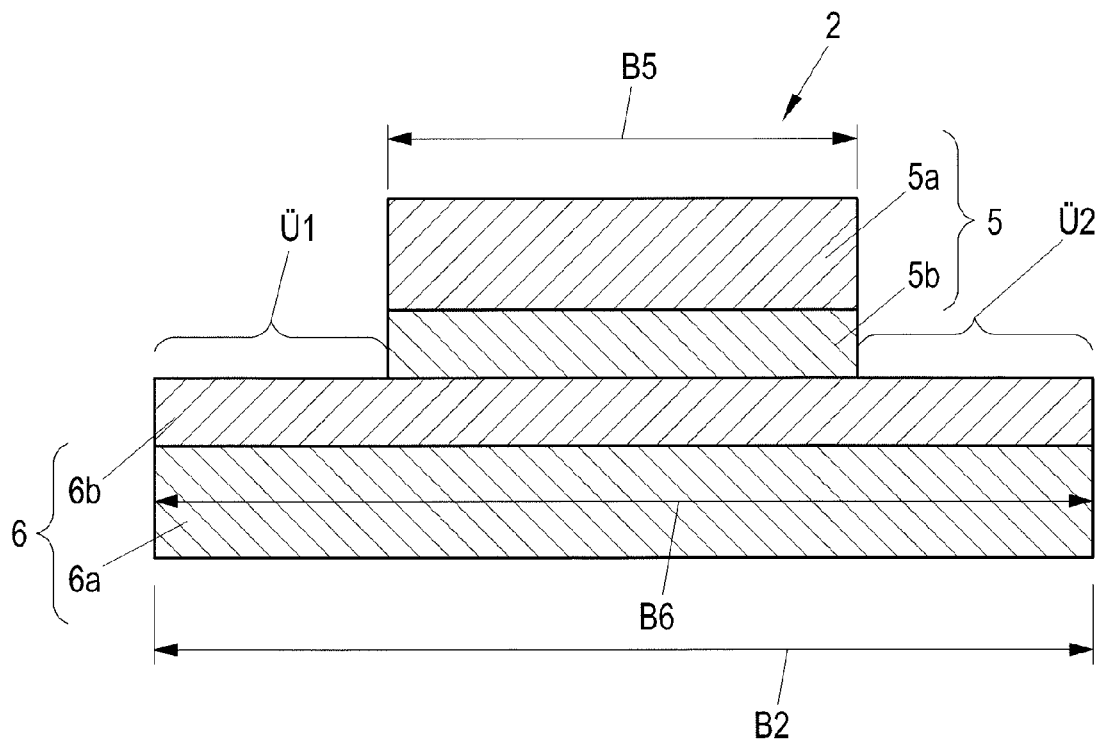

Each of the two tape plies 5, 6 of the adhesive tape 2, which is exemplarily illustrated in two embodiments in FIGS. 5 and 6, respectively consists of a band-shaped carrier material 5a, 6a, which is at least respectively coated on one side with a self-adhesive coating 5b, 6b created in particular by a pressure sensitive adhesive. This configuration of the tape plies 5, 6 is only shown in FIGS. 5 and 6.

In this case it is also possible that only one of the tape plies 5, 6 is respectively provided with the self-adhesive coating 5b, 6b and each of the other tape plies 5, 6 remains uncoated. The adhesive coating 5b, 6b can respectively be applied to the entire surface or partially, for example in strips. Thus, coating strips extending parallel to one another in the longitudinal direction of the band L can preferably be provided.

Furthermore, the apparatus 1 according to the present invention comprises at least two winding rolls 7 to which the tape plies 5, 6 can be fed and on which they are laminated to the adhesive tape 2. This process is illustrated in FIG. 6 and is common to all embodiments of the invention. The feeding rolls 3, 4a, 4b and the winding rolls 7 are arranged axially parallel to one another.

The laminated adhesive tapes 2 produced in this manner usually have widths B2 in the range of 25 mm to 100 mm and lengths in the range of 5 m to 100 m. The initial rolls, from which the individual tape plies 5, 6 are cut, usually have widths in the range of 500 mm to 2000 mm and lengths in the range of 500 m to 5000 m. The lengths of the rolls in particular depend on the material. As the diameters of the rolls frequently are subject to technical limitations, longer rolls can be produced with thin carrier materials than with thick materials.

According to the present invention, the first embodiment provides that the first feeding roll 3 is formed of such an initial roll, i.e. as a so-called wide roll, on which the carrier material 5a provided with the coating 5b has a greater width B3 than required for laminating. This required width is respectively shown in the drawing with the reference numeral B5 for the first tape ply 5 and with the reference numeral B6 for the second tape ply 6.

On the second feeding roll 4a and on the third feeding roll 4b, the carrier material 6a provided with the coating 6b already has the width B6 required for laminating in the first embodiment of the invention. These feeding rolls 4a, 4b are customary operational rolls, as described above, which have to be prefabricated in the first instance. The width B6 of the rolls 4a, 4b can in this case each be in the same range as the width B2 of the finished adhesive tape 2, preferentially in the range of 25 mm to 100 mm, the length, which can also be in the range from 5 m to 100 m, and consequently the diameter of the roll, being different from the wide roll.

Figure 4:
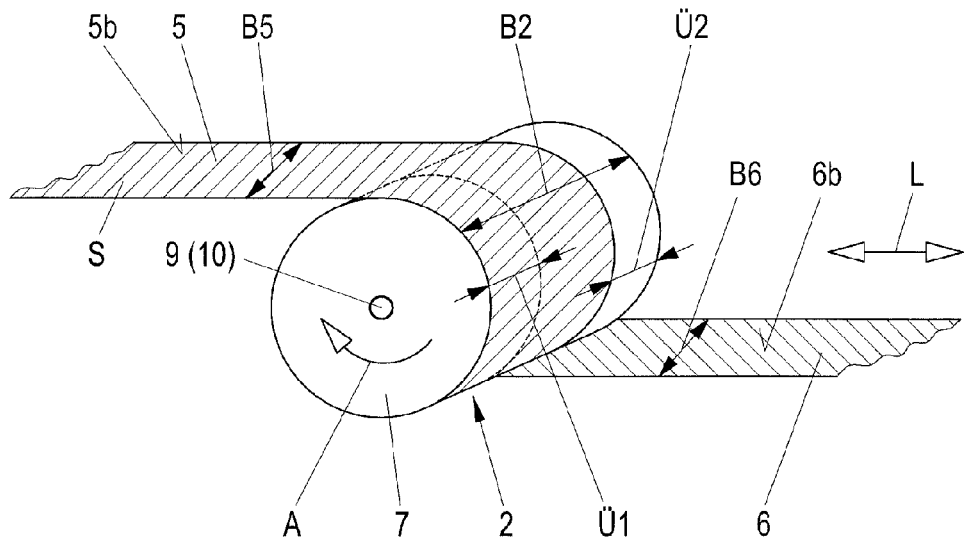
FIG. 4 is an enlarged illustration compared to FIGS. 1 to 3 of a winding roll of an apparatus according to the present invention to implement the method according to the present invention.

As FIG. 4 in particular illustrates, the first tape ply 5 is laminated with its adhesive coating 5b with a lateral projection that is at least configured on one of its longitudinal sides against the adhesive coating 6B of the second tape ply 6, when the adhesive tape 2 is formed by the laminated tape plies 5, 6 and rolled onto the winding roll 7. In the embodiments of the adhesive tape 2 shown in FIGS. 4 to 6 there are lateral projections configured on both longitudinal sides which are denoted with the reference numerals Ü1 and Ü2. The adhesive tape 2 can later be adhered at these places during the assembly, while it is non-adhesive in the region in between which is not specified in more detail. The respective projection (Ü1, Ü2 or Ü1+Ü2) by which the adhesive tape 2 is wider than at least one of the tape plies 5, 6 can measure preferably at least 5.00 mm.

It is further provided according to the present invention that between the wide roll and the winding rolls 7 at least one cutting device 8 is arranged to separate the carrier material 5a provided with the adhesive coating 5b into strips which extend in the longitudinal direction of the band L. Crush cutting, shear cutting, blade cutting, laser cutting or water jet cutting can be used, depending on the material and the thickness of the tape ply 5. In case of crush cutting, the cutting device 8 is one in which a circular knife works against a roller. When using the shear cutting method, a circular knife "dives" into a lower knife; and in case of using the blade cutting system, a stationary blade dives at least one-sided into the transiting carrier material 5a provided with the adhesive coating 5b.

In the first embodiment, with the method according to the present invention and immediately before laminating, the carrier material 5a with the great width B3 provided with the adhesive coating 5b is unwound from the wide roll and cut into the two strips S extending in the longitudinal direction of the band L that forms the first tape ply 5, which each have the width B5 required for laminating in order to form the first tape ply 5. The strips S are separated, i.e. placed at a distance from one another, and at the same time laminated against the second tape ply 6 to form 2 adhesive tapes, which are wound onto the separate winding rolls 7.

In particular the strips S can be advantageously separated by arranging the separate winding rolls 7 alternately on different shafts 9, 10, the winding rolls 7 being driven in the same direction by their allocated shafts (arrow A in FIG. 4). In this case, at least two winding rolls 7, preferentially a plurality of winding rolls 7 are arranged on each shaft 9, 10, whereby the shafts 9, 10 can be driven, in particular, at the same speed, preferably by only one, for example, electromotive drive.

Figure 2:
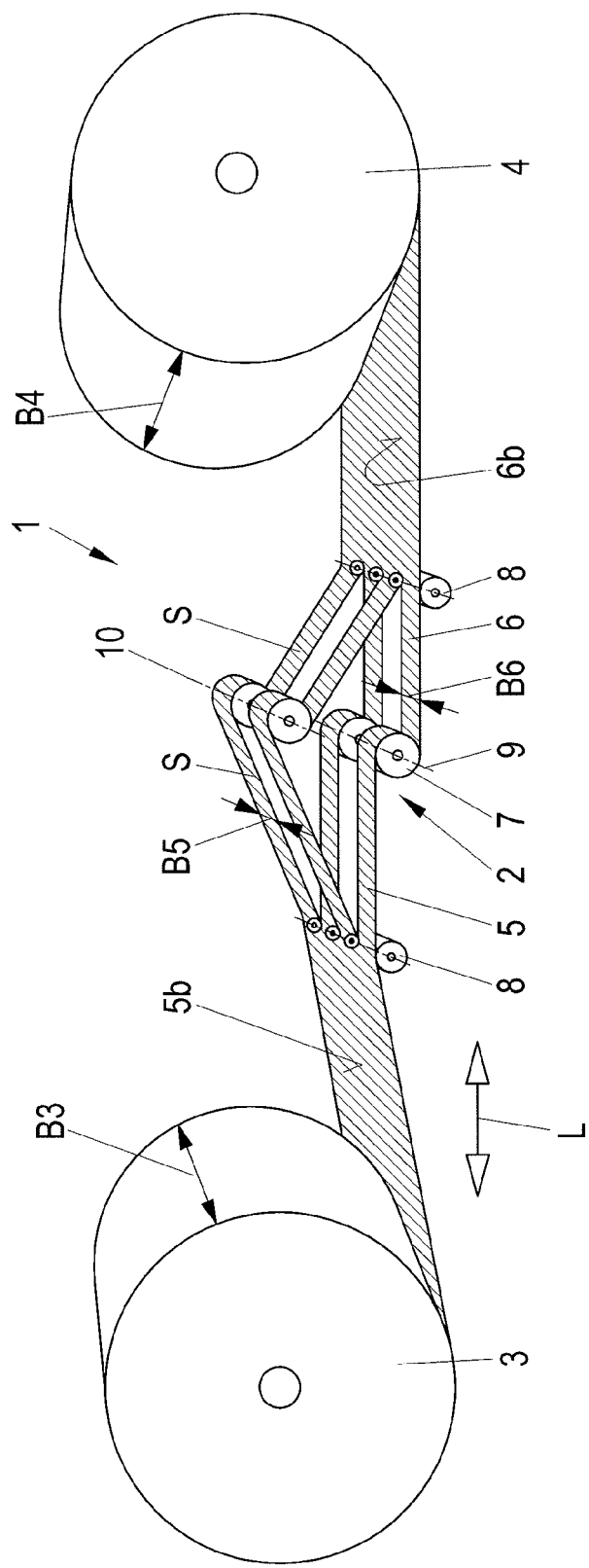
FIG. 2 is an illustration corresponding to FIG. 1 of a second embodiment of an apparatus according to the present invention to implement a second embodiment of the method according to the present invention.

FIG. 2 shows a second embodiment of an apparatus 1 according to the present invention to implement a second embodiment of a method according to the present invention. In this regard to form the second tape ply 6 the carrier material 6a provided with the adhesive coating 6b is unwound from a feeding roll 4—which is likewise configured as a wide roll—on which the carrier material 6a provided with the adhesive coating 6b having a greater width B4 than the width B6 required for laminating. The carrier material 6a provided with the adhesive coating 6b is cut into at least two strips S, each forming the second tape ply 6, of the required width B6 immediately before laminating; the strips S are separated and at the same time laminated onto the strips S of the first tape ply 5. That is, at least one cutting device 8 is arranged between each of the wide rolls that forms the feeding rolls 3, 4 and the winding rolls 7.

Figure 3:
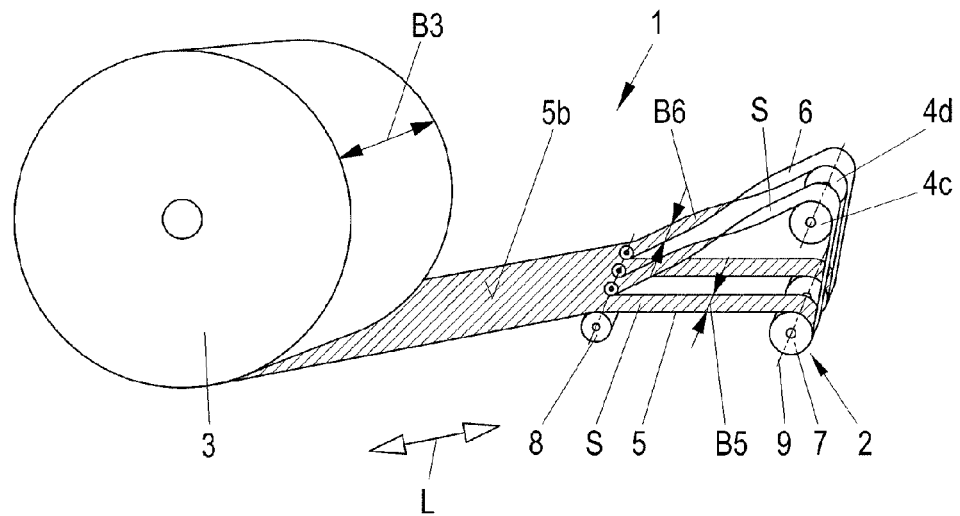
FIG. 3 is an illustration corresponding to FIGS. 1 and 2 of a third embodiment of an apparatus according to the present invention to implement a third embodiment of the method according to the present invention.

FIG. 3 illustrates the third embodiment of an apparatus 1 according to the present invention to implement a third embodiment of a method according to the present invention which is different from the second exemplary embodiment of the invention in that the carrier material 5 provided with the adhesive coating 5b is used for forming the first tape ply 5 as well as for forming the second tape ply 6. For this purpose, material is unwound from a common wide roll that forms the first feeding roll 3 and respectively cut into four strips S, which form the first tape ply 5 and the second tape ply 6 having the width B5, B6 required for laminating. As shown, at least three cutting devices 8, for example three knives, are required in a common cutting apparatus for this purpose. A minimum variant is to cut the carrier material 5 provided with the adhesive coating 5b into two strips S that form the first tape ply 5 and the second tape ply 6, at least one cutting device 8, for example one knife, having to be used in a cutting apparatus.

All strips S are separated, and the strips S for forming the second tape ply 6 are turned 180 and, as in the first embodiment of the invention, in turn simultaneously laminated on the strips S for forming the first tape ply 5. In this case, the first and the second strip S are laminated against one another, the third strip S against the fourth and—if available—the fifth against the sixth, and so on.

Following the 180°-rotation on the deflection rolls 4c, 4d, the second tape plies 6 are guided to the winding rolls 7 by means of said rolls, to which each second strip S is guided after the cutting devices 8 have passed. Guiding each second strip S to the deflection rolls 4c, 4d also causes the separation of the strips S. The winding rolls 7 can be arranged, as illustrated, at least on only one shaft 9 here.

One preferred application of adhesive tapes 2 produced according to the present invention, as they are shown by way of example in FIGS. 5 and 6, is helically wrapping cable sets, whereby a cable harness, especially for the automotive industry, can be formed from several, in particular, electrical conductors, each being provided with an insulation, by at least partially wrapping them with the adhesive tape 2.

But basically the wrapping can be not only helical but also along the product to be sheathed, wherein a longitudinal axis of the adhesive tape 2 is aligned parallel to the direction of the longitudinally extended product. In the adhesive tape according to FIG. 5, it is provided that a second tape ply 6 is laminated onto the first tape ply 5 which has the same width B6 as the width B5 of the first tape ply 5. Adhesive projections Ü1,Ü2 are provided on both sides, the adhesive projection Ü1 on one of the longitudinal sides of the adhesive tape 2 being the same size as the projection Ü2 on the other longitudinal side of the adhesive tape 2, but the adhesive coatings 5b, 6b pointing in opposite directions (in the Figure: once upward and once downward). In the adhesive tape according to FIG. 6 it is provided that a second tape ply 6 is laminated onto the first tape ply 5 which has a greater width B6 than the width B5 of the first tape ply 5. The adhesive projection Ü1 on the longitudinal side of the adhesive tape 2 is the same size as the projection on the other longitudinal side of the adhesive tape 2, the adhesive coatings 5b, 6b pointing in the same direction (both upward in the figure) owing to this type of laminating, and the adhesive tape 2 having the same widths B2, B6 as the tape ply 6.

It is also apparent from this that, when in the aforementioned application mention is made of "the required width" B5, B6, into which the strips S are cut, it can basically be any width B5, B6, which is in each case derived from the desired properties of the adhesive tape 2 to be produced. If only strips S of the same width B5 (or B6) are cut from the carrier material 5a (or 6a) provided with the adhesive material 5b (or 6b) which, however, as shown in FIG. 6, is not absolutely necessary, the result is that the "greater width" B3 (or B4), which the carrier material 5a provided with the adhesive coating 5b must have on the feeding roll 3 (or 4) configured as a wide roll, must be at least twice as great as the required width B5 (or B6). In case of differently wide strips, the minimum width B3 (or B4) on the wide roll results as the total sum of the different widths B5 (or B6) of all strips S, which are cut according to the present invention.

A considerably higher protection from abrasion is accomplished by the double-ply configuration of the adhesive tape 2 than with single-ply sheathings. In the shown configuration, the thickness of the protective coating advantageously corresponds to a conventional adhesive tape wrapped helically with 50 percent overlap.

The invention restricted to the illustrated exemplary embodiments, but the person skilled in the art can complement them with other convenient technical measures as needed without abandoning the context of the invention. As already mentioned, the person skilled in the art can thus provide a larger number of cutting devices 8, winding rolls 7, feeding rolls 4a, 4b and optionally deflection rolls 4c, 4d. Instead of the illustrated deflection rolls 4c, 4d, a rigid rod can be used for example, for the 180° deflection so that in this regard, reference can be made to a deflection direction, for which the deflection rolls 4c, 4d are an example in FIG. 3.

For the adhesive tape 2, it can be provided that the carrier material 5a of the first tape ply 5 as well as the carrier material 6b of the second tape ply consists of a foil or of a foil composite material or of a fabric, in particular of a polyester or polyamide fabric, or of a non-woven material. In this connection, it is possible to adjust a desired property profile of the adhesive tape 2 by means of special combinations of carrier materials. By selecting different materials for the carrier materials 5a, 6a of both tape plies 5, 6, which in the applied state of an adhesive tape 1 forms the inner and outer side of a sheathing, different types of functions of adhesive tapes can easily be combined with one another. The carrier materials 5a, 5b in this case can also have a multilayer structure.

Furthermore, adhesive tape embodiments can also be provided which are not symmetrically configured regarding the projections Ü1, Ü2, or in which the first tape ply 5 only protrudes on one side with respect to the lateral edge of the second tape ply 6. If necessary, one tape ply 5, 6 can be formed by a wide strip S and the other tape ply 6, 5 by several narrow strips. With respect to such possible tape ply embodiments, reference is made in particular to the carrier material combinations described in DE 20 2007 012 475 U1.

For the adhesive coatings 5b, 6b such combinations can be provided in which the pressure sensitive adhesive has a chemical composition such that a homogeneous pressure sensitive mass is formed in the presence of a light contact pressure exerted on both adjoining adhesive layers 5b, 6b eliminating the boundary layers resulting in the total coalescence of the adhesive layers 5b, 6b. Pressure sensitive adhesives based e.g. on rubber, acrylates, silicones or polyurethanes can be used for this purpose.

While the above description constitutes the preferred embodiment of the present invention, it will be appreciated that the invention is susceptible to modification, variation and change without departing from the proper scope and fair meaning of the accompanying claims.

The invention claimed is:

1. A method for producing at least one adhesive tape that can be used for the longitudinal sheathing of longitudinally extended products, comprising the steps of
providing a carrier material (5a, 6a) which is at least partially coated with an adhesive coating (5b, 6b) on at least one side and is wound on a feeding roll (3, 4, 4a, 4b) which is configured as a wide roll, on which the carrier material (5a, 6a) has a greater width (B3) than a width (B5, B6) required for laminating,
unwinding the carrier material (5a, 6a) from the feeding roll (3, 4, 4a, 4b),
cutting the carrier material (5a, 6a) into a plurality of strips (S) extending in the longitudinal direction of the tape (L) and having the width (B5, B6) required for laminating,
separating the plurality of strips from each other, each strip of the plurality of strips forming one of a first tape ply and a second tape ply (6), resulting in a plurality of first tape plies and a plurality of second tape plies,
laminating each of the first tape plies (5) with the adhesive coating (5b, 6b) against a respective one of the second tape plies (6) with a lateral projection (Ü1, Ü2) configured on at least one of the longitudinal sides of the first and second tape plies laminated to each other, thereby forming at least two adhesive tapes (2), and
winding the at least two adhesive tapes (2) composed of the first and second laminated tape plies (5, 6) onto separate winding rolls (7).

2. The method according to claim 1, wherein the steps of unwinding the carrier material (5a, 6a) provided with the adhesive coating (5b, 6b), cutting the carrier material the plurality of strips (S) of the required width (B5, B6), and separating the strips, are performed immediately before laminating the strips (S) such that they each form one of the tape plies (5, 6) in the at least two adhesive tapes (2).

3. The method according to claim 1, wherein the step of separating the strips (S) is performed by alternately guiding the strips (S) on winding rolls (7) arranged on different respective shafts (9, 10), and driving the winding rolls (7) in the same direction (A) by the respective shafts.

4. The method according to claim 3, further comprising the step of providing several winding rolls (7) arranged on each of the respective shafts (9, 10), and driving the respective shafts (9, 10) at the same speed by one single drive.

5. The method according to claim 1, wherein the step of cutting the carrier material (5a, 6a) with the adhesive coating (5b, 6b) into strips (S) is performed by crush cutting, shear cutting, blade cutting, burst cutting, using a laser, or with a water jet.

6. The method according to claim 1, wherein the width (B5, B6) required for laminating and a width (B2) of the adhesive tape (2) are each in the range of 25 mm to 100 mm, the width (B5, B6) required for laminating at least the strip (S) of one tape ply (5, 6) being respectively smaller than the width (B2) of the adhesive tape (2).

7. The method according to claim 1, wherein the width (B3, B4) of the wide roll is in the range of 500 mm to 2000 mm.

8. A method for producing at least one adhesive tape that can be used for the longitudinal sheathing of longitudinally extended products, comprising the steps of
providing a carrier material (5a, 6a) which is at least partially coated with an adhesive coating (5b, 6b) on at least one side and is wound on a feeding roll (3, 4, 4a, 4b) which is configured as a wide roll, on which the carrier material (5a, 6a) has a greater width (B3) than a width (B5, B6) required for laminating,
unwinding the carrier material (5a, 6a) from the feeding roll (3, 4, 4a, 4b),
cutting the carrier material into at least two pairs of strips (S), one strip of each pair forming a first tape ply (5) and the other strip of each pair forming a second tape ply (6) extending in the longitudinal direction of the tape (L) and having the width (B5, B6) required for laminating,
separating the strips from each other,
rotating one strip of each pair of strips by 180° for forming the first tape ply (5) and laminating the rotated strips (S) onto the other strip of the pair of strips (S) that forms the second tape ply (6), with a lateral projection (Ü1, Ü2) configured on at least one of the longitudinal sides of the one of the first and second tape plies of each pair, thereby forming at least two adhesive tapes (2), and
winding the at least two adhesive tapes (2) onto at least one winding roll (7).

* * * * *